(12) United States Patent
Kim et al.

(10) Patent No.: US 10,748,201 B2
(45) Date of Patent: Aug. 18, 2020

(54) SOCIAL INFORMATION MANAGEMENT METHOD AND SYSTEM ADAPTED THERETO

(71) Applicant: Samsung Electronics Co., Ltd., Gyeonggi-do (KR)

(72) Inventors: Jin Yong Kim, Seoul (KR); Nobuyoshi Ueyama, Tokyo (JP); Masato Watanabe, Tokyo (JP); Yu Ran Kim, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 257 days.

(21) Appl. No.: 15/585,460

(22) Filed: May 3, 2017

(65) Prior Publication Data

US 2017/0236186 A1    Aug. 17, 2017

Related U.S. Application Data

(63) Continuation of application No. 13/468,556, filed on May 10, 2012, now abandoned.

(30) Foreign Application Priority Data

May 23, 2011  (KR) .......................... 10-2011-0048359

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06Q 30/0207* (2013.01); *G06Q 30/0261* (2013.01); *G06Q 50/01* (2013.01)

(58) Field of Classification Search
CPC ....................................................... G06Q 30/00
See application file for complete search history.

(56) References Cited

U.S. PATENT DOCUMENTS 7,516,086 B2    4/2009  Chu et al.
7,857,212 B1 *  12/2010  Matthews .............. G06Q 10/02
                                              235/380
(Continued)

FOREIGN PATENT DOCUMENTS

CN    101680925 A    3/2010
CN    101802855 A    8/2010
(Continued)

OTHER PUBLICATIONS

Deal Alert, "Credit card offers from our partner deals and coupons", Dealsea.com, dated Feb. 5, 2007 (Year: 2007).*

(Continued)

*Primary Examiner* — Mark A Fadok
(74) *Attorney, Agent, or Firm* — Cha & Reiter, LLC.

(57) ABSTRACT

A social information management method and system designate a plurality of mobile devices as a group list of mobile devices that share the information based on a social network; create social information in a mobile device, by registering an item selected or input to the mobile device while the mobile device operates a user function; and shares the social information with the mobile devices in the information sharing group list.

17 Claims, 16 Drawing Sheets

(51) Int. Cl.
  *G06Q 50/00* (2012.01)
  *G06Q 30/02* (2012.01)

(56) References Cited

U.S. PATENT DOCUMENTS

| | | | |
|---|---|---|---|
| 8,195,656 B2 | 6/2012 | Grasset | |
| 8,239,273 B1 | 8/2012 | Marshall et al. | |
| 8,504,486 B1 | 8/2013 | Pinto | |
| 9,972,047 B1* | 5/2018 | Elliott | G06Q 30/02 |
| 2002/0032607 A1 | 3/2002 | Kuwahara | |
| 2002/0062249 A1 | 5/2002 | Iannacci | |
| 2002/0069122 A1 | 6/2002 | Yun et al. | |
| 2003/0216960 A1 | 11/2003 | Postrel | |
| 2004/0249710 A1* | 12/2004 | Smith | G06Q 20/223 705/14.27 |
| 2005/0143052 A1 | 6/2005 | Pradhan et al. | |
| 2008/0078831 A1 | 4/2008 | Johnson et al. | |
| 2008/0140674 A1 | 6/2008 | Ishikawa | |
| 2008/0161018 A1* | 7/2008 | Miller | G06Q 30/0255 455/456.3 |
| 2008/0167991 A1 | 7/2008 | Carlson et al. | |
| 2008/0189189 A1 | 8/2008 | Morgenstern | |
| 2008/0255977 A1 | 10/2008 | Altberg et al. | |
| 2008/0262928 A1 | 10/2008 | Michaelis | |
| 2009/0013052 A1* | 1/2009 | Robarts | G06Q 10/107 709/206 |
| 2009/0043644 A1* | 2/2009 | Wilkman | G06Q 30/02 705/7.29 |
| 2009/0082051 A1 | 3/2009 | Ruotsi | |
| 2009/0265734 A1* | 10/2009 | Dion | G06Q 30/02 725/34 |
| 2009/0287714 A1 | 11/2009 | Vasudevan et al. | |
| 2009/0319306 A1* | 12/2009 | Chanick | G01C 21/3679 705/5 |
| 2009/0327151 A1* | 12/2009 | Carlson | G06Q 30/0224 705/80 |
| 2010/0008535 A1 | 1/2010 | Abulafia et al. | |
| 2010/0010824 A1 | 1/2010 | Kim et al. | |
| 2010/0179857 A1 | 7/2010 | Kalaboukis et al. | |
| 2010/0211445 A1* | 8/2010 | Bodington | G06Q 30/02 705/14.17 |
| 2011/0016023 A1 | 1/2011 | Zakas | |
| 2011/0029363 A1* | 2/2011 | Gillenson | G06Q 30/02 705/14.15 |
| 2011/0041063 A1 | 2/2011 | Lee et al. | |
| 2011/0071924 A1* | 3/2011 | Desmond | G06Q 20/32 705/27.1 |
| 2011/0093335 A1* | 4/2011 | Fordyce, III | G06Q 20/40 705/14.53 |
| 2011/0106635 A1* | 5/2011 | Khan | G06Q 20/12 705/14.73 |
| 2011/0136511 A1* | 6/2011 | Patoskie | G06F 3/017 455/456.3 |
| 2011/0161188 A1* | 6/2011 | Roberts | G06Q 20/10 705/17 |
| 2011/0184780 A1 | 7/2011 | Alderson et al. | |
| 2011/0231305 A1* | 9/2011 | Winters | G06Q 20/10 705/39 |
| 2011/0264581 A1* | 10/2011 | Clyne | G06Q 20/10 705/39 |
| 2011/0320345 A1* | 12/2011 | Taveau | G06Q 20/32 705/39 |
| 2011/0320373 A1 | 12/2011 | Lee et al. | |
| 2012/0036018 A1* | 2/2012 | Feliciano | G06Q 30/02 705/14.66 |
| 2012/0084122 A1 | 4/2012 | Boehle | |
| 2012/0123935 A1* | 5/2012 | Brudnicki | G06Q 20/20 705/41 |
| 2012/0130797 A1* | 5/2012 | Shin | G06Q 20/32 705/14.38 |
| 2012/0173402 A1* | 7/2012 | Nicolaidis | G06Q 20/28 705/37 |
| 2012/0197691 A1* | 8/2012 | Grigg | G06Q 20/20 705/14.1 |
| 2012/0220314 A1* | 8/2012 | Altman | G06Q 30/0207 455/456.3 |
| 2012/0265685 A1* | 10/2012 | Brudnicki | G06Q 30/06 705/44 |
| 2012/0278167 A1* | 11/2012 | Schwartz | H04M 3/02 705/14.53 |
| 2012/0290449 A1* | 11/2012 | Mullen | G06Q 10/00 705/27.2 |
| 2013/0073459 A1* | 3/2013 | Zacarias | G06Q 20/36 705/41 |
| 2013/0166332 A1* | 6/2013 | Hammad | G06Q 40/10 705/5 |
| 2013/0325667 A1* | 12/2013 | Satyavolu | G06Q 30/0201 705/26.64 |
| 2014/0258110 A1* | 9/2014 | Davis | G06Q 20/227 705/41 |
| 2014/0324691 A1* | 10/2014 | Thomas | G06Q 20/0655 705/41 |
| 2015/0081540 A1* | 3/2015 | Grigg | G06Q 20/20 705/41 |
| 2015/0141125 A1* | 5/2015 | LeStrange | G06Q 20/04 463/25 |
| 2015/0221149 A1* | 8/2015 | Main | G07C 9/00119 340/5.61 |
| 2015/0269557 A1* | 9/2015 | Artman | G06Q 20/3278 705/41 |
| 2016/0048865 A1* | 2/2016 | Poon | G06Q 30/0238 705/14.38 |
| 2016/0063483 A1* | 3/2016 | Gula | G06Q 30/06 705/41 |
| 2016/0092866 A1* | 3/2016 | Liberty | G06Q 20/3224 705/41 |
| 2016/0239831 A1* | 8/2016 | Saunders | G06Q 20/36 |
| 2018/0137500 A1* | 5/2018 | Greene | G06Q 20/363 |

FOREIGN PATENT DOCUMENTS

| | | |
|---|---|---|
| CN | 101853458 A | 10/2010 |
| JP | 2002-48563 A | 2/2002 |
| JP | 2002-63464 A | 2/2002 |
| JP | 2002-304545 A | 10/2002 |
| JP | 2003-43970 A | 2/2003 |
| JP | 2004-126898 A | 4/2004 |
| JP | 2008-191979 A | 8/2008 |
| KR | 10-2004-0016771 A | 2/2004 |
| KR | 10-2006-0115532 A | 11/2006 |
| KR | 10-2007-0033622 A | 3/2007 |
| KR | 10-2009-0081579 A | 7/2009 |
| KR | 10-2010-0103735 A | 9/2010 |
| KR | 10-2011-0016349 A | 2/2011 |
| KR | 10-2011-0020679 A | 3/2011 |
| RU | 2 368 957 C1 | 9/2009 |
| WO | 2008/083115 A1 | 7/2008 |
| WO | 2010/147828 A1 | 12/2010 |

OTHER PUBLICATIONS

European Search Report dated Nov. 2, 2017.
Chinese Search Report dated Feb. 3, 2020.

\* cited by examiner

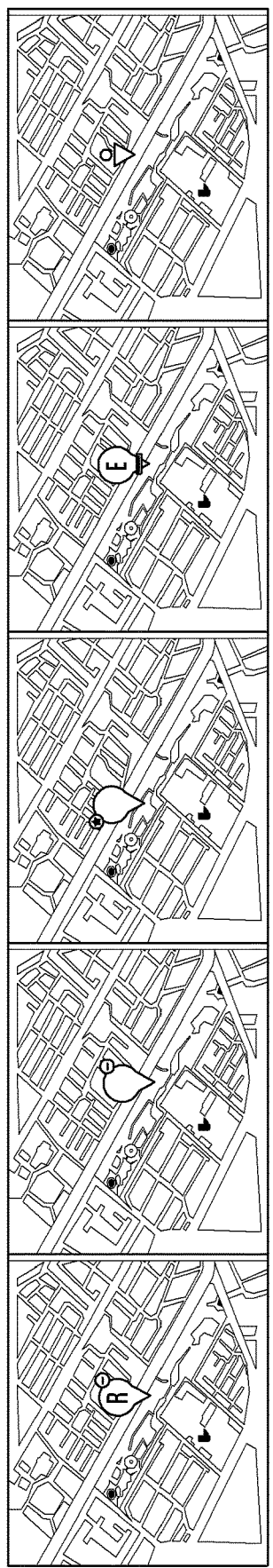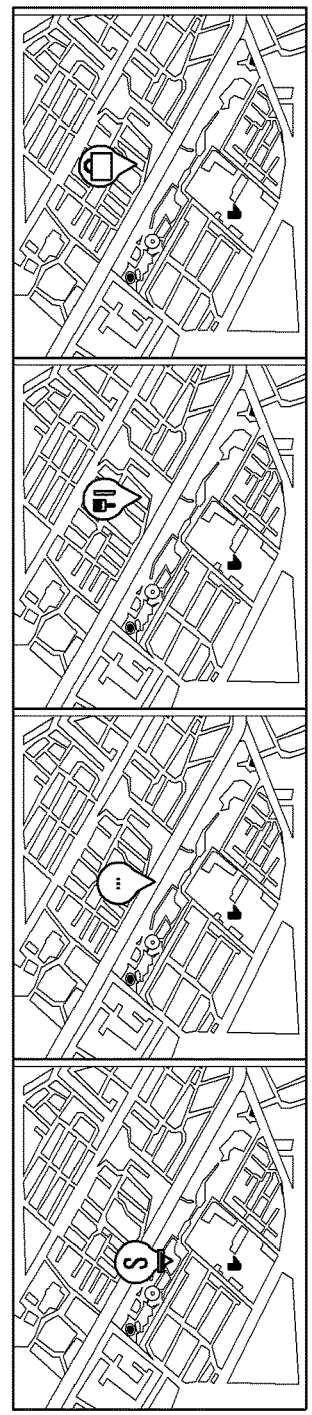

FIG. 14A
FIG. 14B
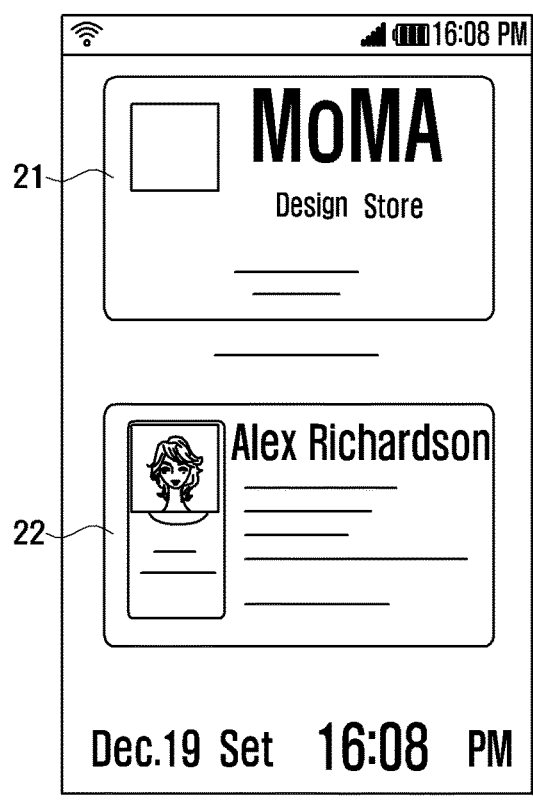
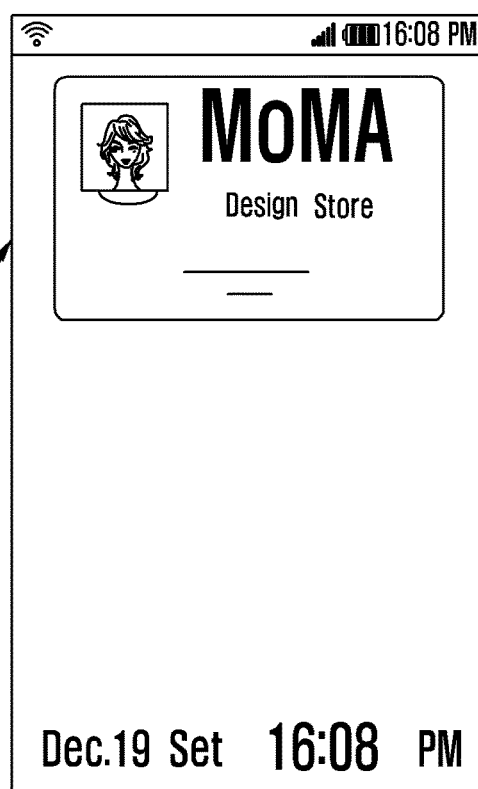

SOCIAL INFORMATION MANAGEMENT METHOD AND SYSTEM ADAPTED THERETO

CROSS REFERENCE TO RELATED APPLICATIONS

This application is a Continuation of U.S. patent application Ser. No. 13/468,556 filed on May 10, 2012 which claims priority under 35 U.S.C. § 119(a) to Korean Patent Application Serial No. 10-2011-0048359, which was filed in the Korean Intellectual Property Office on May 23, 2011, the entire disclosure of which is hereby incorporated by reference.

BACKGROUND OF THE INVENTION

1. Field of the Invention

This invention relates to mobile devices, and more particularly, to a social information management method and system that provides user services with a variety of types and a higher level of reliability, by sharing social information and using the shared social information.

2. Description of the Related Art

Mobile devices have been widely used because they can be easily carried and provide various types of functions as well as a voice call function. Mobile devices operate in a variety of input modes to provide user functions. For example, conventional mobile devices are equipped with touch screens with touch panels and display units. When users select or execute an image or icon displayed on the display unit by touching the touch panel, the mobile device creates a touch event according to the user's touch, and controls the corresponding application program to provide a user function.

Conventional mobile devices can also provide Internet services, so that the user can access information via the Internet. For example, when conventional mobile devices allow for the installation of Internet-based messenger application programs, it can support the messenger functions that users could use in real-time anytime and anywhere. In addition, conventional mobile devices can also allow the users to use a service related to the purchase of articles of commerce, for example, searching for reviews regarding an article of commerce and purchasing it. However, conventional Internet-based service systems receive information with indiscreetness; that is, information from various sources may be received, including unreliable sources of information, and thus the users have difficulty choosing the proper information. For example, when users chose improper information from indiscreet information regarding an article of commerce or a service to purchase and then choose to complete the purchase, they may have complaints after purchase regarding the article or service, and they may further lose or fail to receive the article or service, and may lose their time spent to obtain the article or service.

SUMMARY OF THE INVENTION

The invention has been made in view of the above problems, and provides a social information management method and system that can allow users to enjoy optimal service and to purchase articles of commerce, by sharing social information with a higher level of reliability and by using the shared social information.

In accordance with an exemplary embodiment of the invention, the invention provides a social information management method including: designating a plurality of mobile devices as a group list of mobile devices that share the social information based on a social network; creating social information in at least one of the mobile devices, by registering at least one item selected or inputted using the at least one mobile device while the at least one mobile device operates a user function; and sharing the social information with the mobile devices in the information sharing group list.

In accordance with another exemplary embodiment of the invention, the invention provides a social information management system including: a plurality of mobile devices that designate themselves as a group list of mobile devices that share the social information based on a social network; create social information in at least one of the mobile devices, by registering at least one item selected or inputted using the at least one mobile device while the at least one mobile device operates a user function, and shares the social information with the other mobile devices; and a server for allowing the mobile devices to share their social information with each other in the information sharing group list, by transmitting the social information to them.

BRIEF DESCRIPTION OF THE DRAWINGS

The features and advantages of the invention will become more apparent from the following detailed description in conjunction with the accompanying drawings, in which:

FIG. 8A, FIG. 8B, FIG. 8C, FIG. 8D, FIG. 8E, FIG. 8F, FIG. 8G, FIG. 8H and FIG. 8I illustrate screens to describe an interface to which location-based social information is applied, according to an example embodiment of the invention;

FIG. 14A and FIG. 14B illustrate screens to describe a card registration function based on social information.

DETAILED DESCRIPTION OF PREFERRED EMBODIMENTS

Figure 1:
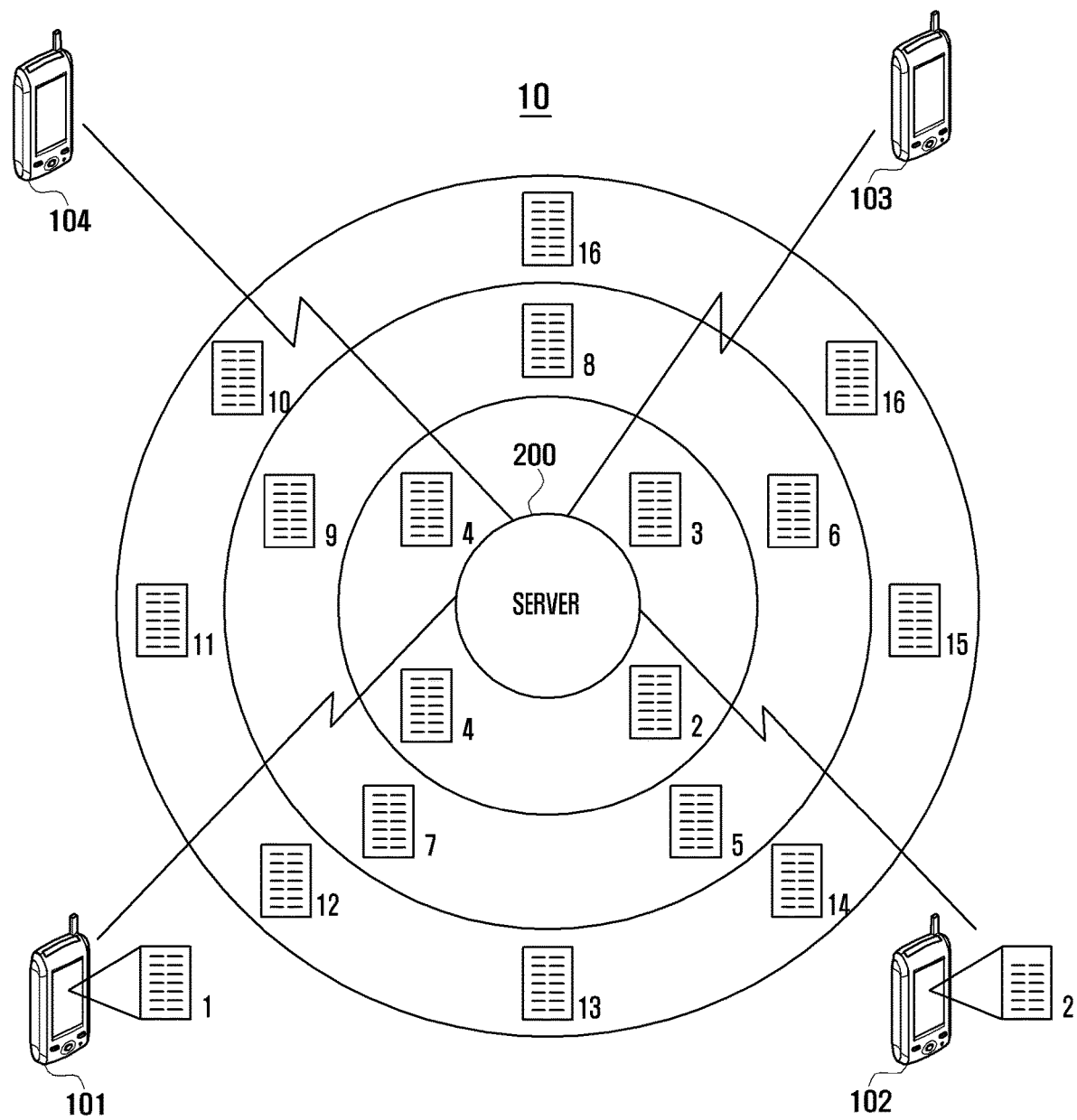
FIG. 1 illustrates a schematic view of the concept of a social information management system according to an example embodiment of the invention.

Hereinafter, preferred embodiments of the invention are described in detail with reference to the accompanying drawings. The same reference numbers are used throughout the drawings to refer to the same or similar parts. This invention may, however, be embodied in many different forms and should not be construed as limited to the exemplary embodiments set forth herein. Detailed descriptions of well-known functions and structures incorporated herein may be omitted to avoid obscuring the subject matter of the invention.

The terms or words described in the present description and the claims should not be limited by a general or lexical meaning, but instead should be analyzed as a meaning and a concept through which the inventor defines and describes the invention, to comply with the idea of the invention. Therefore, one skilled in the art will understand that the embodiments disclosed in the description and configurations illustrated in the drawings are only preferred embodiments, and instead there may be various modifications, alterations, and equivalents thereof to replace the embodiments at the time of filing this application, so the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

The above-described methods according to the present invention can be implemented in hardware, firmware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

FIG. 1 illustrates a schematic view of the concept of a social information management system according to a preferred embodiment of the invention.

Referring to FIG. 1, the social information management system 10 includes an information providing server 200 and a number of mobile devices 101, 102, 103, and 104.

The social information management system 10 allows the mobile devices 101, 102, 103, and 104 to input personal/social information to a server 200, to register such personal/social information in the server 200, and to share such personal/social information with the other mobile devices in the group list (e.g., the mobile devices 101, 102, 103, and 104). The group list of mobile devices may be defined in a variety of ways. For example, if the users of the mobile devices 101, 102, 103, and 104 set the mobile devices 101, 102, 103, and 104 to share the social information with each other, the mobile devices 101, 102, 103, and 104 are grouped in one group.

In the following description, for the sake of convenience, the mobile devices 101, 102, 103, and 104 are called first, second, third and fourth mobile devices respectively. When the first mobile device 101, second mobile device 102, third mobile device 103 and fourth mobile device 104 are formed as a social information sharing group, the information providing server 200 receives the social information from the respective mobile devices and stores the social information. The server 200 transmits the stored social information to the first mobile device 101, second mobile device 102, third mobile device 103 and fourth mobile device 104, so that the mobile devices 101, 102, 103, and 104 can share the other parties' social information with each other. In addition, when the respective mobile devices 101, 102, 103, and 104 update the social information, the server 200 transmits the updated social information to the other mobile devices in the same group, in real time or at a later point in time, such as when the mobile devices, having performed the social information updating process, make a request, so that all the mobile devices in the group can share the updated social information with each other. According to the settings of the respective mobile devices 101, 102, 103, and 104, the server 200 can allow the mobile devices to access social information inputted into the other mobile devices that can access the World Wide Web or the Internet in general, and can also provide corresponding social information to a mobile device according to the request. Such input social information may be entered into a particular mobile device through a keyboard or other input devices, for example, by a user associated with the particular mobile device. When social information regarding the respective mobile devices 101, 102, 103, and 104 is altered as the mobile devices 101, 102, 103, 104 use web services, the server 200 can update the social information and transmit the updated social information to the other mobile devices in the group.

The mobile devices 101, 102, 103, and 104 can share the social information with each other, with respect to the information sharing server 200 as a base station. To this end, the mobile devices 101, 102, 103, and 104 write or otherwise receive and transmit the social information or other selections of information from users of the mobile devices 101, 102, 103, 104, respectively, and provide information to set limits or restrictions regarding the other mobile devices with which each of the mobile devices will share the written, inputted, and/or selected social information to the information sharing server 200. In that case, the server 200 supports a service where the social information can be shared between the mobile devices that allow for the inter-designation and sharing of such social information with other similarly designated mobile devices. When the mobile devices 101, 102, 103, and 104 are set to operate a particular user function, they can support a user function to which the shared social information is applied to. For example, the user of the first mobile device 101 can write first social information that includes purchase information regarding an article of commerce or service, and that may also include a reply or review of the article or service after using the article or service, based on the Web access by the user. In that case, the first social information of the first mobile device 101 can be shared by the second mobile device 102 in the same group, based on information stored in the server 200. Therefore, when the user of the second mobile device 102 intends to purchase the same article of commerce or service that the user of the first mobile device 101 purchased, he/she can review the first social information and identify whether the article of commerce or service meets with his/her purpose or preference. As such, the mobile devices 101, 102, 103, and 104 can share the social information in a preset group, so that each user of a respective mobile device 101, 102, 103, 104 can easily acquire information with a higher level of reliability and thus enjoy the best or optimal articles of commerce or services, since such articles of commerce or services are preferred or enjoyed by other users in the social network, in which the users of the mobile devices 101, 102, 103, 104 are members. While the respective mobile device users designate a group to share the social information, they can recognize information regarding the other mobile device users who were grouped in the group. Therefore, any new mobile device users can acquire social information with a higher level of reliability without additional efforts. In the following description, the method for sharing social information and the method for providing social information services will be described in detail based on one of the mobile devices, which is labeled generally by reference number 100 in FIG. 2, and which may include at least one of the mobile devices 101, 102, 103, 104.

Figure 2:
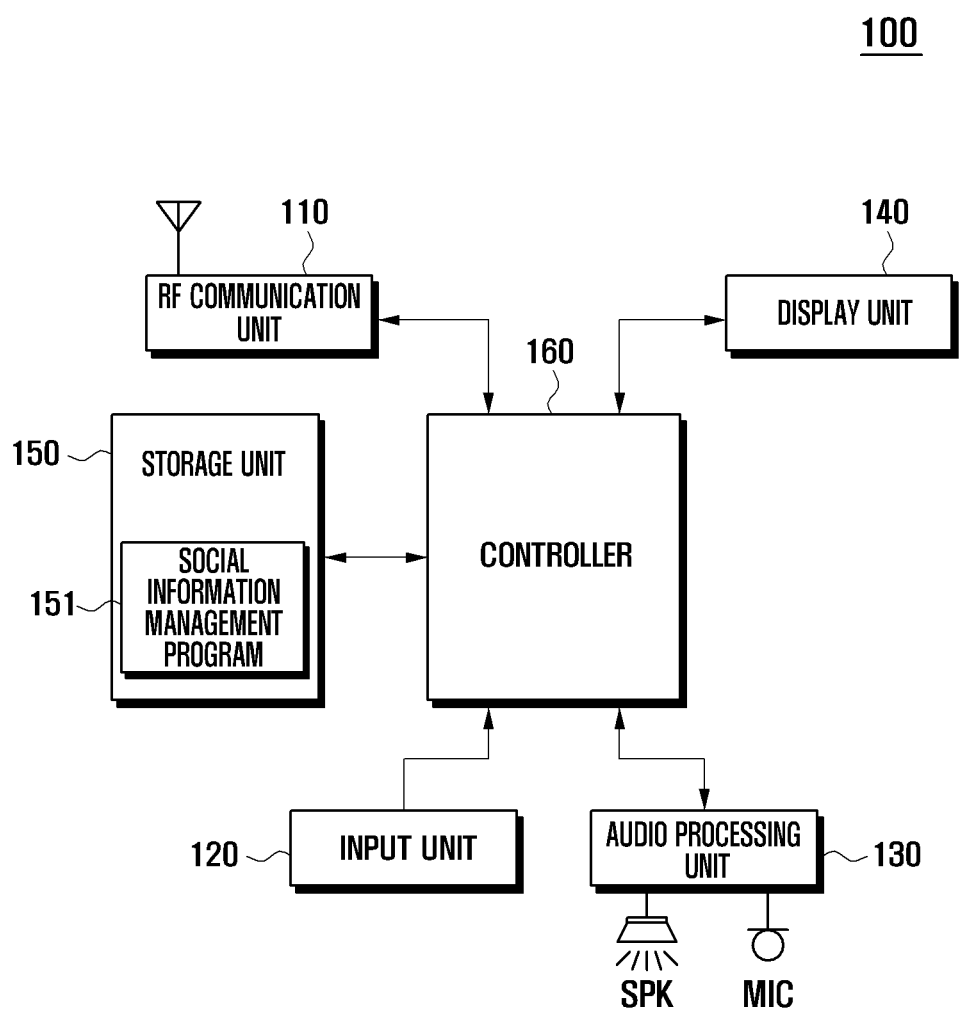
FIG. 2 illustrates a schematic block diagram of a mobile device shown in FIG. 1.

FIG. 2 illustrates a schematic block diagram of each of the mobile devices shown in FIG. 1.

Referring to FIG. 2, the mobile device 100 includes an RF communication unit 110, an input unit 120, an audio processing unit 130, a display unit 140, a storage unit 150, and a controller 160. In particular, the display unit 140 and the input unit 120 may be implemented with a touch screen to create a signal for executing an icon altering function.

The mobile device 100 supports the functions of: creating social information, sharing the social information with the other mobile devices in the same group, and managing user functions based on the shared social information. To this end, the mobile device 100 provides a social information management program 151 stored in the storage unit 150 and operated by the controller 160, with the social information management program 151 being integrated with a program for creating social information, a program for allowing the created social information to be shared, and a program for performing function applications based on the shared social information. The operations of the components in the mobile device 100 are described in detail referring to the accompanying drawings.

The RF communication unit 110 establishes a channel for making a voice or video call and a data communication channel for transmitting data, such as videos, messages, etc., under the control of the controller 160. The RF communication unit 110 establishes a voice or video call channel or a data communication channel using an external mobile communication system. To this end, the RF communication unit 110 includes an RF transmitter for up-converting the frequency of signals to be transmitted and amplifying the signals and an RF receiver for low-noise amplifying received RF signals and down-converting the frequency of the received RF signals. In an example embodiment of the invention, the RF communication unit 110 establishes a data communication channel with Internet-based services providing servers storing data, as well as the information sharing server 200 shown in FIG. 1. For example, when a user of a mobile device 100 writes, inputs, selects or otherwise enters the social information based on the mobile device function management, the mobile device 100 transmits the received social information to the server 200 via the data communication channel of the RF communication unit 110. The RF communication unit 110 can also receive social information from the server 200, written, inputted, selected or otherwise entered by the other mobile devices and registered in the server 200. The social information is shared by only the mobile devices grouped as a group list in the server 200. Although the social information is shared in a group list of mobile devices, the social information may also be propagated to web-based cyber space or other remote memory locations and networks, according to the settings of a corresponding mobile device. The RF communication unit 110 may receive at least one of purchase information, sale information, event information, coupon information, advertisement information, etc. To this end, the RF communication unit 110 may be implemented with a short-range communication module for communicating with relatively close electronic devices, such as electronic kiosks and other sources of information and/or access to the Internet or other communication and social networks.

The input unit 120 includes input keys and function keys that allow the user of the mobile device 100 to input numbers or letter information and to set a variety of functions. The function keys include direction keys, side keys, shortcut keys, etc., which are set to perform specific functions. In addition, the input unit 120 creates key signals for setting user's options and for controlling functions of the mobile device 100 and transfers such options to the controller 160. The input unit 120 can be implemented with a QWERTY keypad, a 3×4 keypad, a 4×3 keypad, etc. The input unit 120 may also be implemented with a variety of key maps displayed on the display unit 140, e.g., a QWERTY key map, a 3×4 key map, a 4×3 key map, a menu map, a control key map, etc. The input unit 120 may also be implemented with only a side key on the side of the case of the mobile device 100 when the display unit 140 is a full touch screen 140. In a preferred embodiment of the invention, the input unit 120 creates input signals for writing, inputting, selecting or otherwise entering the user's social information, an input signal for sharing the entered social information, an input signal for activating a particular user function based on the shared social information, and an input signal for managing the activated user function. The input unit 120 transmits the created signals to the controller 160 to support a variety of social information-based user services.

Referring again to FIG. 2, the audio processing unit 130 outputs, to the speaker (SPK), audio data during a call, audio data included in a received message, or audio data created when audio files stored in the storage unit 150 are reproduced. The audio processing unit 130 also receives audio signals such as the user's voice via the microphone (MIC). The audio processing unit 130 provides information regarding audio data required for the management of social information. In order to provide audio information regarding a user function to which social information is applied, the mobile device 100 can store preset audio information. The stored audio information is output, according to saved settings, when a corresponding user function is activated.

When the mobile device 100 is equipped with a touch screen, the display unit 140 includes a display panel and a touch panel. In that case, the touch panel is installed in the front of the display panel. The size of the display unit 140 is determined by the size of the touch panel.

The display panel displays menus for accessing and using the mobile device 100, and also displays information input by the user or information provided to the user. The display panel provides various types of screens according to the operations of the mobile device 100, such as an idle screen, menu screens, a message writing screen, a call screen, etc. The display panel may be implemented with a Liquid Crystal Display (LCD), an Organic Light Emitting Diode (OLED), etc. The display panel may be placed on or below the touch panel. In particular, the display panel can display a variety of screens corresponding to the operations of the mobile device, such as, writing social information, sharing social information, applying the social information to a function, etc. The screens will be described in detail later, referring to the accompanying drawings.

The touch panel is placed on or below the display panel. The touch panel senses a touch event of an object such as the finger and transfers a signal corresponding to the touch event to the controller 160. The touch panel includes a number of sensors that may be arrayed in a matrix form. The touch panel senses a touch event that occurred via the sensors and transfers, to the controller 160, the location information regarding to the touch event and information regarding the type of touch event. In an example embodiment of the invention, the touch panel may be set to receive touch events in predetermined layouts or displayed screens to write social information, share it, and apply it to functions. The set touch panel senses user's touch events and transfers the corresponding signals to the controller 160.

The storage unit 150 stores application programs for executing functions according to the invention. The storage unit 150 also stores a key map, a menu map, or the like, to operate the display unit 140. The key map and menu map can be implemented in various modes. For example, the key map may be a keyboard map, a 3×4 key map, a QWERTY key map, etc. The key map may also be a control key map for controlling an application program that is currently activated. The menu map may be a map for displaying menus for controlling an application program that is currently activated. The storage unit 150 includes a program storage area and a data storage area.

The program storage area stores an operating system (OS) for booting the mobile device 100 and controlling the components of the mobile device 100. The program storage area also stores application programs that are necessary for a variety of functions of the mobile device 100, such as a call function, a web browser, an audio reproduction function (e.g., MP3 files), an image display function (e.g., photographs), a video reproduction function, etc. In particular, the program storage area stores a social information management program 151.

The social information management program 151 includes a number of routines, for example, for creating social information; for sharing the created social information; and for supporting the application of a shared social information based-function. The routine for creating social information includes a sub-routine for outputting a social information interface. The social information interface supports functions for selecting or registering items, such as data representing articles of commerce or services, as social information, for newly linking particular information to a corresponding item, and for correcting or deleting previously registered information.

Note a user can register at least one of item which are selected from a user interface of performing a particular function of the mobile device, as a social information. Accordingly, the social information may be any item among a variety information generated by using the mobile device and selected by user.

The routine for sharing the created social information includes a sub-routine for transmitting written, inputted, or selected social information to the information sharing server 200, and a sub-routine for updating the other social information transmitted from the server 200. The routine for supporting the application of the shared social information based-function includes a sub-routine for identifying one of the user functions, provided by the mobile device 100, which needs the application of social information, and a sub-routine for applying the social information, previously stored in the storage unit 150 or provided by the server 200, to a corresponding function.

The data storage area stores data generated when the mobile device 100 is used, for example, phone book data, at least one icon associated with a widget function, and contents. The data storage area also stores a user's inputs via the touch panel. The data storage area stores social information that is registered by the mobile devices that are defined as a sharing group. The stored social information may be updated in real-time, periodically, or each time that the information sharing server 200 sends an instruction to update the stored social information.

The controller 160 controls the supply of electric power to the components in the mobile device 100 and initializes them. The controller 160 controls the signals related to the operations for writing, inputting, or selecting social information, sharing such social information, and applying functions to the social information, such as filtering or editing such social information. To this end, the controller 160 includes components as shown in FIG. 3.

Figure 3:
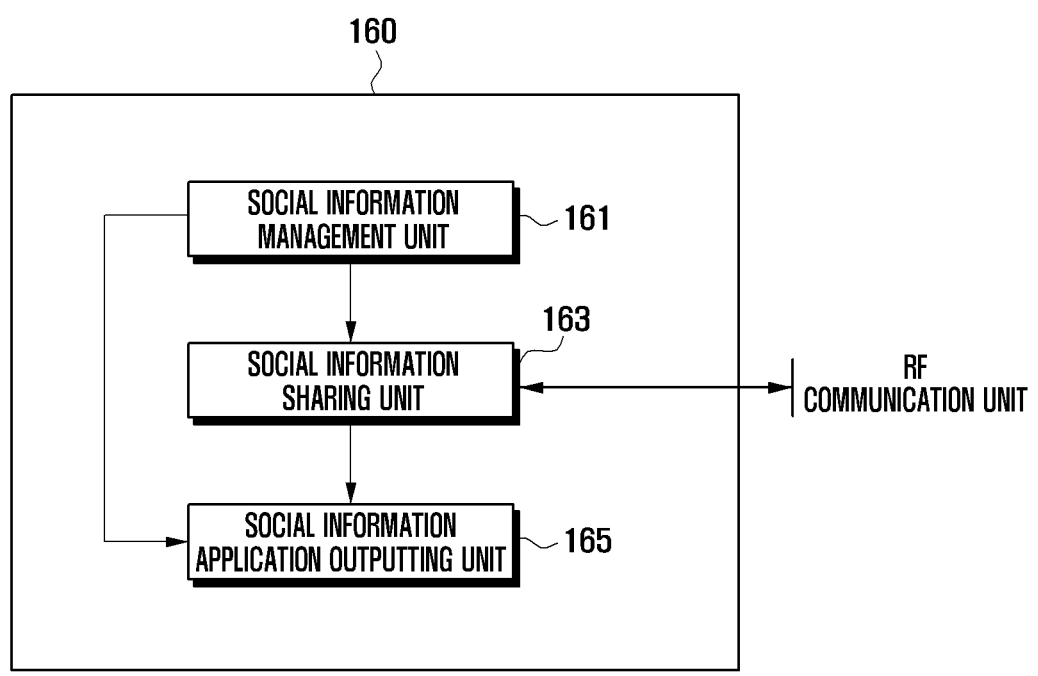
FIG. 3 illustrates a detailed view of the controller in the mobile device shown in FIG. 2.

FIG. 3 illustrates a detailed view of the controller 160 in the mobile device shown in FIG. 2.

Referring to FIG. 3, the controller 160 includes a social information management unit 161, a social information sharing unit 163, and a social information application outputting unit 165.

The social information management unit 161 supports the output of a social information interface. The social information management unit 161 registers a user's selected items in social information and manages the selected items according to the user's control and choices. When the user describes information regarding a particular item, the social information management unit 161 links the information to the item and stores the item information. The social information management unit 161 can also store and manage social information of the other mobile devices that the social information sharing unit 163 receives from the information sharing server 200. The social information management unit 161 can support a function for sharing information in the group of mobile devices. For example, a mobile device user can designate people registered in his/her phone book, e.g., family members, friends, etc., to a common group. In another example, when the user of the mobile device designates family members or friends to a common group, the social information management unit 161 transmits such designations to the server 200. In that case, the server 200 transmits the information regarding the group designation to corresponding users, friends or family members, and may also transmit the user's written, inputted, or selected social information to the mobile devices of such users, friends, and family members designated in a common group. When the family members or friends agree with the group designation of the user of the mobile device 100, that is, agree to include the user in their group, the server 200 transmits their written, inputted, or selected social information to the mobile device 100 of the user. As such, when the social/personal common group, designated by the user of the mobile device 100, is configured, the users in the sharing group can share the social information with each other.

The social information sharing unit 163 transmits social information, which has been created, managed or updated by the social information management unit 161, to the information sharing server 200. When the social information sharing unit 163 receives a request for updating social information of the other mobile devices from the server 200, the social information sharing unit 163 receives the information and transfers such information to the social information management unit 161. In that case, the social information management unit 161 updates the corresponding stored social information with the newly received social information. The social information sharing unit 163 may not open portions of the social information if the user sets certain portions or categories of social information as private information.

The social information application outputting unit 165 displays, on the display unit 140, social information stored therein or transmitted from the server 200, according to the user's request. The social information application outputting unit 165 applies the stored social information to a particular user function and controls the screen output or audio output corresponding to the function. For example, when the user searches for corresponding information from web pages, etc., the social information application outputting unit 165 searches the stored social information for an item related to the corresponding information and displays the related item and the corresponding information on the display unit 140. The information displayed on the display unit 140 may be information regarding an article of commerce or service, the purchase information, any reviews, the purchase location, etc.

When a function for purchasing an article of commerce or service is activated, the social information application outputting unit 165 searches for the social information and selects a proper settlement method or mechanism based on the searched social information. To this end, the social information may include information regarding a financial card, such as a credit card, a debit card, a rewards card, and the like, of the user associated with the mobile device. Although the card information of the user is registered in his/her social information, the user may set the card information as private information, so that such card information cannot be shared.

Figure 4:
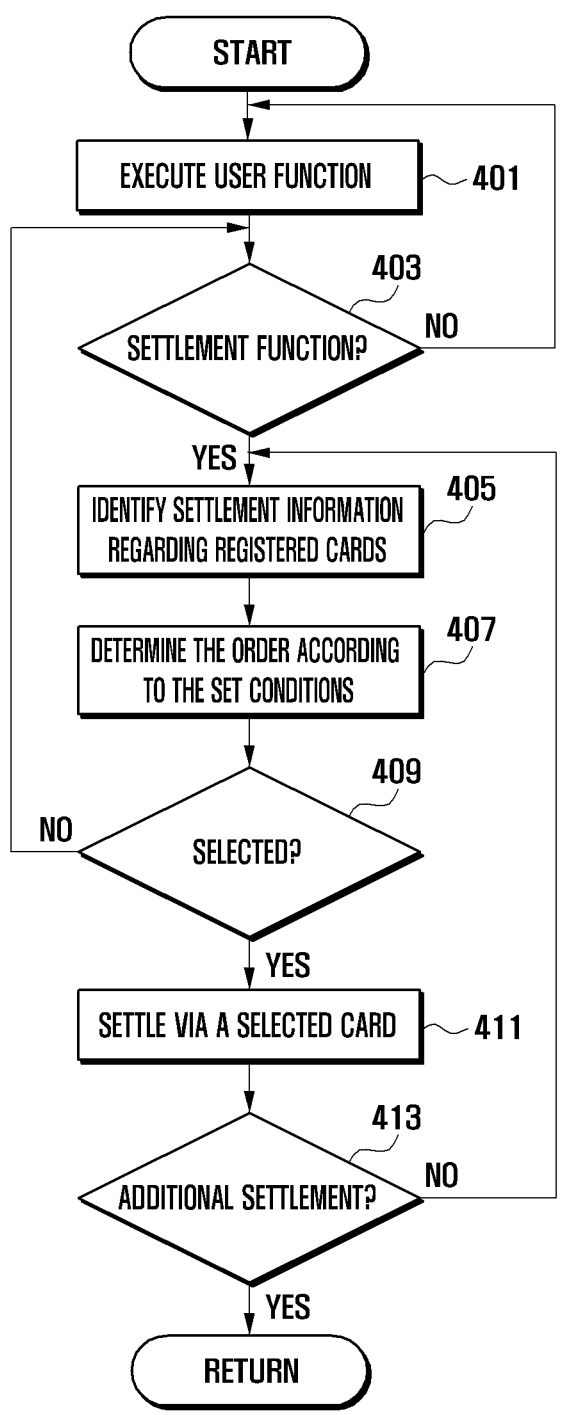
FIG. 4 illustrates a flow chart showing, in detail, a settlement method of the social information management method according to an example embodiment of the invention.

FIG. 4 illustrates a flow chart showing, in detail, a settlement method of the social information management method according to a preferred embodiment of the invention.

Referring to FIG. 4, the social information-based settlement method is performed as follows. A user function based on social information is executed according to a user's request in step 401. The user function may be a function related to performing a financial settlement, e.g., an article purchase function. The user operates the mobile device 100 and visits a web site selling articles of commerce or services. The controller 160 of the mobile device 100 downloads web pages including information regarding at least one article of commerce or service from the web site. The controller 160 displays the downloaded web pages on the display unit 140. When the user selects one of the items, either an article of commerce or a service, from the web pages in order to register the item in his/her social information, the controller 160 can support a function so that the user can write, input, or select the social information including at least one selected item.

After that, the controller 160 determines whether an event occurs to activate a settlement function for the article of commerce or service as the item registered in the social information in step 403. That is, the controller 160 detects whether the user selects one of the articles of commerce or services as the items registered in the social information and then makes a settlement for the selected item via the mobile device 100.

When the controller 160 ascertains that an event for a settlement function for the article of commerce does not occur at step 403, the controller 160 returns to step 401 and operates the activated user function or executes a function according to a corresponding event. Using the functions described above, the user of the mobile device 100 can register a list of items, such as articles of commerce or services, that he/she wishes to purchase (i.e., a wish list) in the social information.

However, when the controller 160 ascertains that an event for a settlement function for the item occurs at step 403, the controller 160 identifies the settlement information via cards that the user has registered for settlement in the social information in step 405. The controller 160 sets the order of settlement to the cards according to predetermined set conditions in step 407. That is, the controller 160 accumulates and stores settlement information regarding the cards, detects information regarding the cards if they have a restricted condition, and sets a priority order of settlement to any cards that satisfy the restricted condition. Examples of the restricted condition are: having to make a settlement exceeding a preset amount of money per month; having a discount rate when a particular article of commerce or service is purchased or if a purchase is made via a particular web site; using any accumulated mileage; accumulating mileage occurs when a purchase has been made of a corresponding article of commerce or service; etc. The controller 160 evaluates the cards associated with the user and based on the restricted conditions, and then sets the priority order of settlement to the cards. After step 407, the controller 160 displays the information regarding the cards with the priority order of settlement on the display unit 140, so that the user can make a selection for which card to use for settlement for his/her selected article of commerce or service.

The controller 160 determines whether the user selects one of the cards in step 409. When the controller 160 ascertains that the user selects one of the cards at step 409, the controller 160 makes a settlement for the user's selected article of commerce or service via the selected card in step 411. During this process, the controller 160 displays, on the display unit 140, screens corresponding to the processes of inputting authentication information for settlement, transmitting the input authentication information, and making authentication, confirmation, and permission. However, when the controller 160 ascertains that the user does not select one of the cards at step 409, the method returns to and proceeds with step 403.

After making a settlement at step 411, the controller 160 determines whether an additional settlement is made in step 413. When the controller 160 ascertains that an additional settlement is made at step 413, the method returns to and proceeds with step 405. However, when the controller 160 ascertains that an additional settlement has not been made at step 413, the method returns to and proceeds with step 401.

When making a settlement, the controller 160 updates item information that is registered in the social information. That is, the controller 160 alters the information regarding an item to be purchased to become information regarding a purchased article in the social information, and so the social information is updated to reflect the purchase. Although an item was purchased according to the user's setting, the item information may not be updated in the social information. When the controller 160 detects a review regarding use of an article or service as input by the user, the controller 160 may link the review to the item in the social information and store the review. When information regarding the purchase of an item is created, the purchase information is updated in the social information. The updated social information is transmitted to the server 200, so that the updated social information can be shared with the other mobile devices in the group. When an item is registered in a list of items that the user wishes to purchase or to have in the social information, the controller 160 updates the social information and transmits the updated social information to the server 200, thereby sharing the updated social information with the other users.

When the user registers a new item based on social information or purchases the registered item, the mobile device 100 updates the social information and shares the updated social information with the other mobile devices in the group list. During the process, the controller 160 searches for the other social information stored in the storage unit 150 to detect information related to an item such as a product selected by the user. When the controller 160 detects information related to a user's selected item, the controller 160 displays the selection information on the display unit 140. However, when the controller 160 does not detect information related to a user's selected item, the controller 160 displays a message showing that there is no information related thereto.

The user can also ask the server 200 whether there is information related to a corresponding item, such as for a particular article of commerce or service, on the Web other than those items currently registered in the social information of the share group list. When the server 200 ascertains that there is information related to a corresponding item on the Web, the server 200 transmits the information to the mobile device 100. As such, the user of the mobile device 100 can first search the share group list with a higher level of reliability for information related to a corresponding item, and may further search the Web with a lower level of reliability for the same information, according to the user's selection.

As described above, the social information management method and system can form a share group list of mobile devices and allow the users to write, input, or select respective social information including favorite and necessary information and share the respective social information of every user with each other in the group, so that any user can acquire information with a higher level of reliability. Therefore, the user can easily acquire information related to an item written by the other mobile device users in the group, e.g., a purchase review, an opinion after use, a purchase place, price, etc. Some users would consider it more important that their acquaintances purchased a corresponding item than know the sold number of the items, and in that case, the social information management method and system can allow such users to acquire information with a higher level of reliability, rather than with a statistical result. That is, the social information management method and system according to the invention can allow the users to share the social information with each other, so that such users can enjoy articles of commerce and services satisfying their preferences. The method and mobile device according to the invention can allow a specific user to use the considerations of other users in the group more systematically and efficiently while the specific user is purchasing articles of commerce or using services. Although an example embodiment is described herein based on the purchase of an article of commerce as an item registered in the social information, it should be understood that the invention is not limited to the example embodiment. For example, the embodiment may also be applied to the use of a place, a service provided in a place, etc.

In the following description, the social information management will be explained referring the accompanying drawings.

Figure 5A:
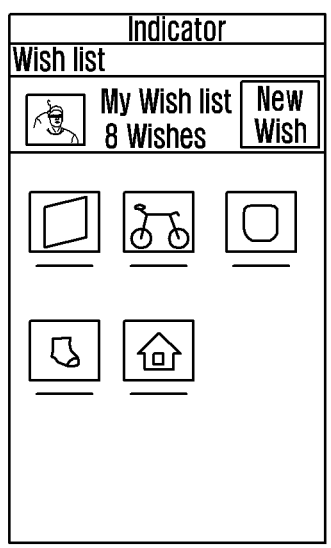
FIG. 5A, FIG. 5B and FIG. 5C illustrate screens displaying a social information interface on the display unit of a mobile device according to an example embodiment of the invention.
Figure 5B:
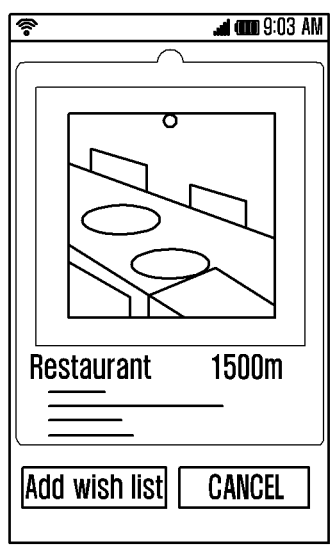
Figure 5C:
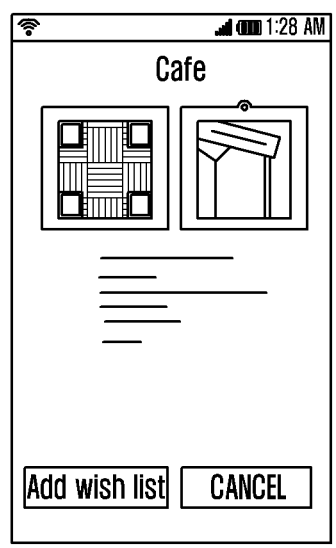

FIGS. 5A-5C illustrate screens displaying a social information interface on the display unit of a mobile device according to an example embodiment of the invention.

A social information interface may be displayed on the display unit 140 via widget icons or menu icons. As shown in FIG. 5A, when a widget icon or a menu icon is selected, the social information interface is displayed on the display unit 140. Alternatively, the social information interface may be displayed on a particular area that is previously allocated and fixed on the background screen, without the use of an additional widget icon or menu icon. The social information interface may include a user's selected items to be registered in the social information from among the items that are searched via a variety of paths, e.g., web search, location search, code search, etc. For example, as shown in FIG. 5B, the user searches for a place via the mobile device 100, e.g., a restaurant, and then registers the information in the social information. In addition, as shown in FIG. 5C, the user searches for a cafeteria and a code, such as a street address or other numerical identifiers, via the mobile device 100, and then registers information regarding the cafeteria and the code in the social information. To this end, the controller 160 can display a screen showing function keys for executing the registration of the social information.

FIGS. 6A-6D illustrate screens displaying items of social information interface according to an example embodiment of the invention.

Figure 6A:
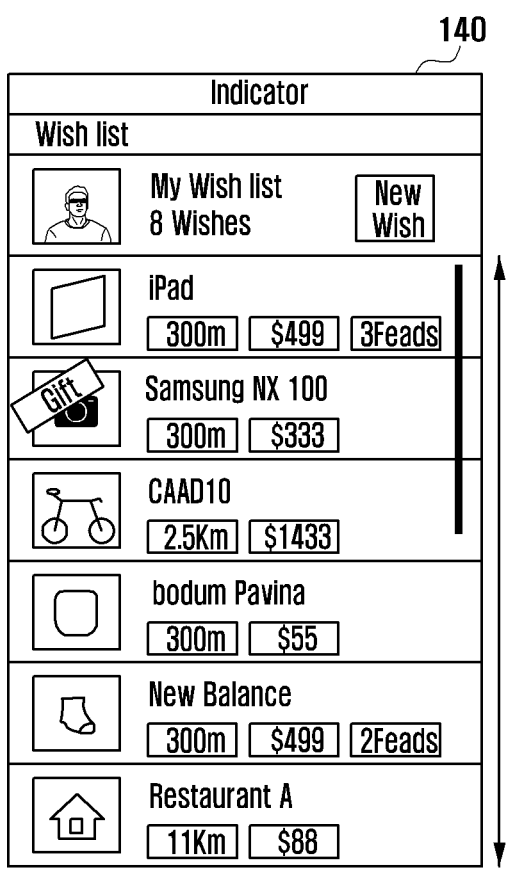
FIG. 6A, FIG. 6B, FIG. 6C and FIG. 6D illustrate screens displaying items on the social information interface according to an example embodiment of the invention.

As shown in FIG. 6A, the controller 160 displays information regarding the number of the user's registered social information items on the display unit 140 when configuring social information interfaces, including a list of summarized information regarding the respective items. Using a location identifying service of a mobile device 100, the controller 160 can respectively display distance information from the current location to a store where the user can buy corresponding items or a place where the user can enjoy a service for corresponding items; price information regarding corresponding items; and information as to whether there is feedback information related to a corresponding item. For example, regarding an item, such as an "iPad", an electronic device commercially available from "APPLE CORPORATION", the controller 160 displays the distance information, for example, 300 m., and price information, for example, 499 USD, as well as three pieces of feedback information, on the display unit 140 of the mobile device 100. The feedback information is registered by the other mobile device users who are designated by the user of the mobile device 100 and in the share group list. The feedback information may vary according to the levels of reliability adjusted by the users. For example, if the user sets the reliability with the highest level, only the information registered in the designated share group list can be linked to a corresponding item as feedback information. When the user adjusts the level of reliability, information related to a corresponding item, provided by a designated web server, etc. other than the share group list, can be registered as feedback information, together with the information registered in the share group list.

Figure 6B:
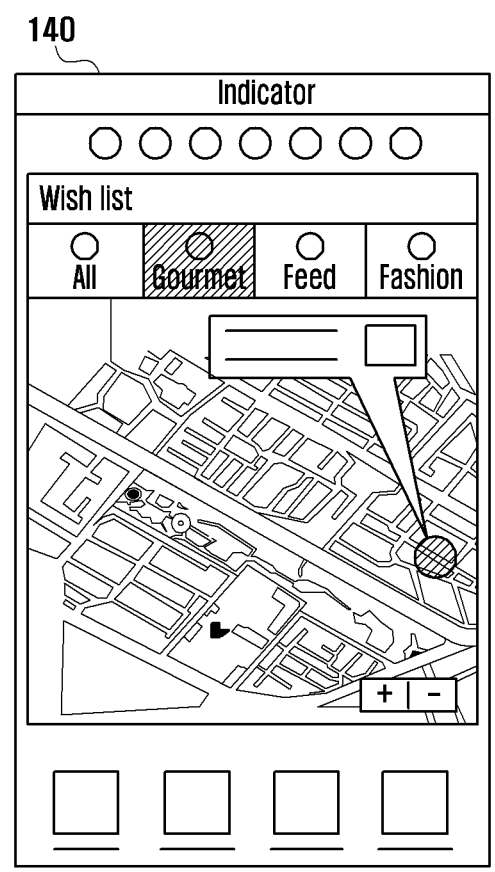
Figure 6C:
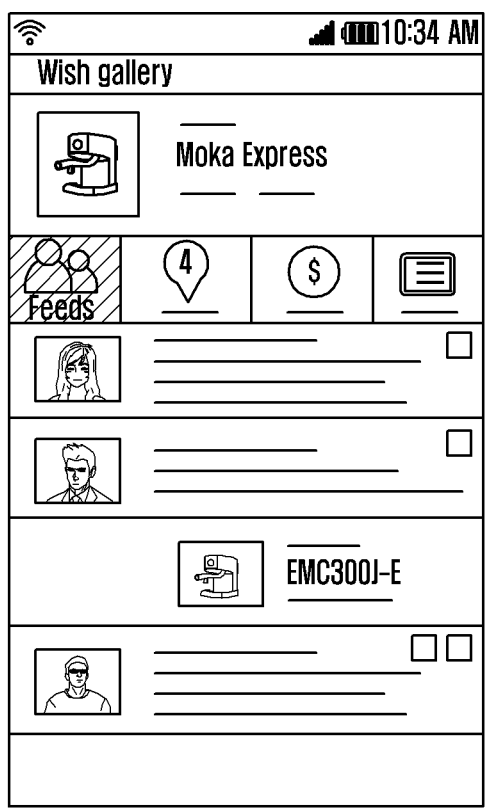
Figure 6D:
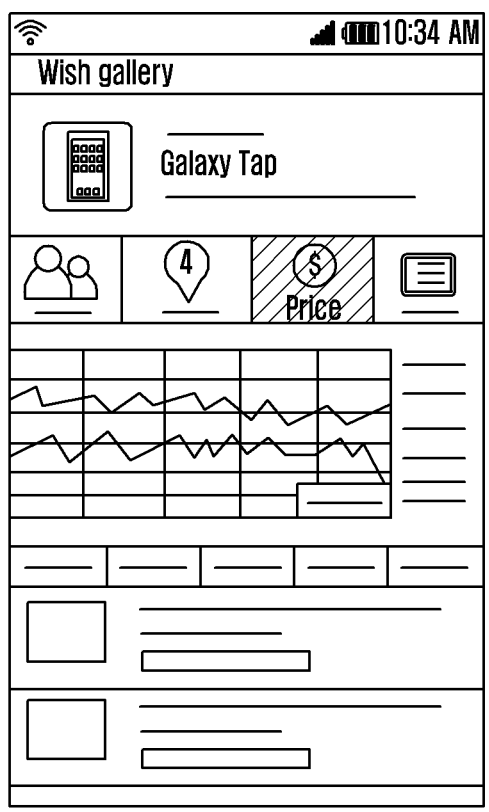

As shown in FIG. 6B, the social information interfaces can be sorted according to various features, such as by topic, and displayed on the display unit 140. When the social information interface includes icons labeled 'all,' 'gourmet,' 'fashion,' and 'feeds,' and one of the displayed icons is selected, the controller 160 displays the information related to the selected icon on the display unit 140. For example, if an icon labeled 'gourmet' in FIG. 6B is selected, the controller 160 displays, on the display unit 140, a corresponding map and location information regarding the items, such as articles of commerce or services corresponding to the selected icon 'gourmet' registered in the social information according to the regions. Likewise, if an icon labeled 'feeds' in FIG. 6C is selected, the controller 160 displays, on the display unit 140, a list of items associated with the labeled icon 'feeds' is linked with feedback information in the social information. In addition, if the user selects an icon labeled 'price' as shown in FIG. 6D, the controller 160 shows details regarding an item, e.g., the price information associated with the icon labeled 'price'.

The social information may be limited to personal/social information written, inputted, or selected by a particular user according to a user's settings. In that case, the controller 160 displays, on the display unit 140, only the items included in corresponding social information, according to the method described above. Alternatively, the controller 160 displays, on the display unit 140, items included in the entire social information shared in the group, according to a user's settings, via the method described above.

A user can view his/her written, inputted, or selected social information and the other users' written, inputted, or selected social information in the sharing group, and can also search for details of a particular item included in the other users' social information. To this end, the controller 160 registers an item, linking with the related details, and stores the item. In addition, the user can register an item as a private item in the social information, and in that case, the information related to the item is not shared with the group.

The details of an item, such as an article of commerce or service, may include a specification, comparison information, information shared via a social network, a list of friends who purchased the item, information regarding on-line or off-line stores that sell the item, the lowest price, price variation, information regarding compared prices between stores, a personally written memo regarding the item, web information related to the item, events or advertisements related to items that users' are concerned about and which have been registered, a date when a pertinent item is registered, a location, a schedule, any search information regarding similar articles of commerce and services, social search information related to a corresponding article and service, etc. When the user selects an item from the social information list and requests a view of details regarding the item, the controller 160 displays a screen showing details regarding the item (i.e., a detailed information screen). The detailed information screen displays details regarding the selected item in the format of tabs. For example, when the user selects a tab or icon labeled 'feeds' shown in FIG. 6C, the controller 160 alters the detailed information screen to display details in a simple view format of feedback information as shown in FIG. 6C. To this end, the controller 160 searches for whether feedback information related to a corresponding item is included in the shared social information and then configures the detailed information screen with the searched feedback information.

As shown in FIG. 6D, if the user selects an icon labeled 'price,' the controller 160 displays a detailed information screen that displays details such as price information. To this end, the controller 160 performs a web search based on information regarding a corresponding item, e.g., name information, and configures a detailed information screen based on price information searched over the web.

Figure 7A:
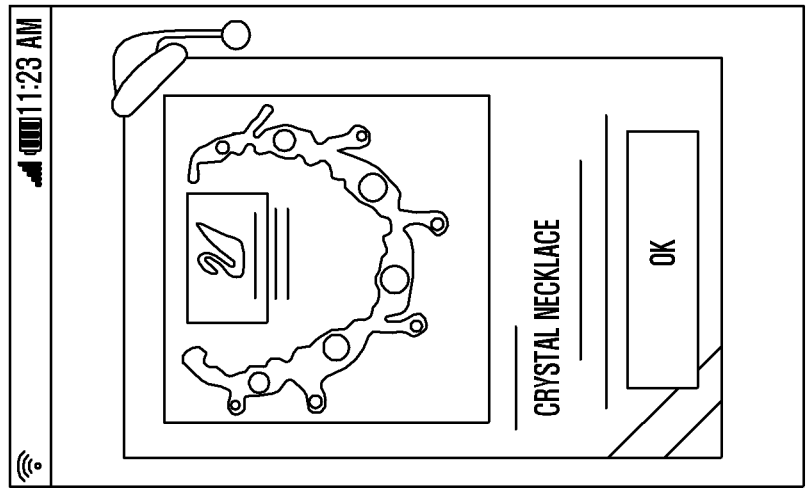
FIG. 7A, FIG. 7B and FIG. 7C illustrate screens integrally displaying shared social information.
Figure 7B:
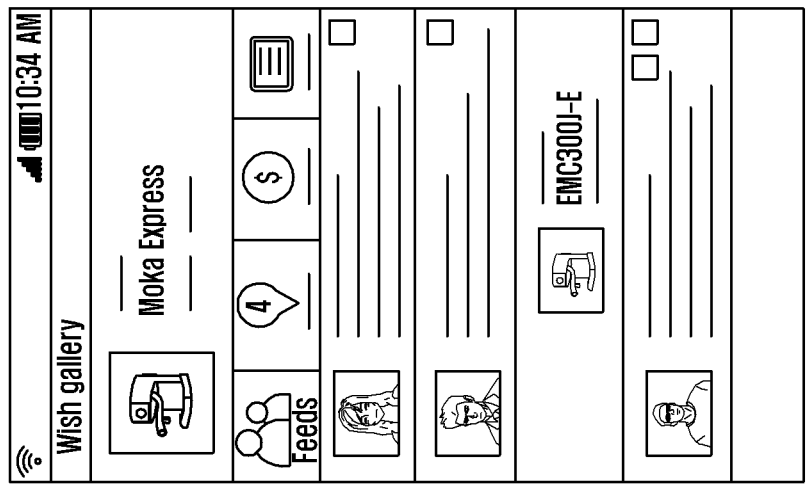
Figure 7C:
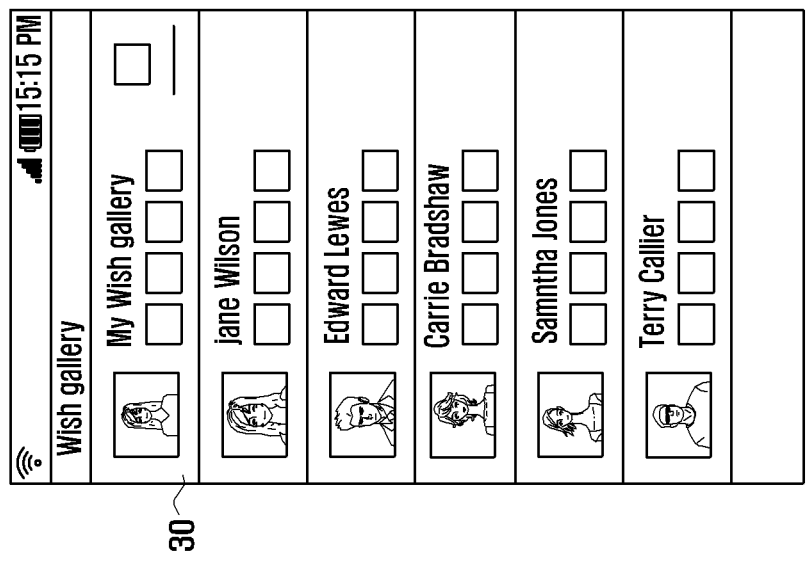

FIGS. 7A-7C illustrate screens integrally displaying shared social information.

In the following description of an example embodiment of the present invention, it is assumed that a sharing group is formed with six mobile device users who share their social information with each other. In that case, as shown in FIG. 7A, the controller 160 provides a social information integrating interface 30 so that a given user can integrally view the shared social information. The social information integrating interface 30 displays individual information associated with the users and item information registered by the users. An example of the individual information may be photograph information registered and associated with the users. An example of the item information may be icon information related to the items. The arrangement of the social information icons on the social information integrating interface 30 is determined when the social information is updated or according to the user's settings. Alternatively, the arrangement may be determined according to a device state such as whether the mobile device is connected to a social network or connection at random to other networks.

When the user designates an item that one of the other mobile device users registers in the social information list, on the screen as shown in FIG. 7A, the controller 160 displays the detailed information screen for displaying details regarding the item on the display unit 140 as shown in FIG. 7B. The detailed information screen can display a variety of tabs as shown in FIGS. 6A to 6D. When one of the tabs is selected, the controller 160 controls the display unit 140 to display information related to the selected tab on the detailed information screen.

The mobile device 100 of the social information management system 10 can support a present or gift providing function as shown in FIG. 7C. A first user of the mobile device 100 makes a settlement for an item, for example, by completing payment of the item, that a particular user has registered to purchase in the shared social information, and then the first user presents the item to the particular user. To this end, when the first user selects an item in the particular user's social information and then selects a function for making a settlement for the item, the controller 160 supports the function for making a settlement as described above. After making a settlement, the controller 160 transmits a present providing message regarding the item to the particular user's mobile device. In that case, the particular user's mobile device displays the received message on the display unit.

In addition, a first mobile device user may request for a present request of an item from a second mobile device user. That is, a first mobile device user can ask the second mobile device user to present an item registered in the first mobile device user's social information to himself/herself. To this end, the first mobile device user can drag and drop an icon corresponding to his/her registered item to the list of the second mobile device user, on the social information integral interface of the first user's mobile device. In that case, the controller 160 of the first user's mobile device detects the creation of a present request signal, writes or otherwise inputs a present request message for the item, and then transmits the present request message to the second user's mobile device. The second user's mobile device displays the received message on the display unit as shown in FIG. 7C. When the second mobile device user accepts to receive the item in the message, the settlement process is performed as described above. After completing the settlement for the item, the message showing that the item is ready to be a present may also be transmitted to the first user's mobile device.

As described above, the social information sharing function can support a variety of functions: for allowing the users in the sharing group to view the registered items each other; for sharing information related to a particular item via feedback; for searching for a user who registered the item in his/her wish list or purchased the item; for providing a reminder alarm regarding social feedback; for surveying the preferences of the other users regarding the registered item; for extending or sharing information regarding an item via other Social Networking Services (SNS) cooperating with the current social information management system; for performing a statistical function based on the information, e.g., the number of users' connections to a corresponding social network; for inviting new users into the sharing group, based on an item search, etc.

Figure 9A:
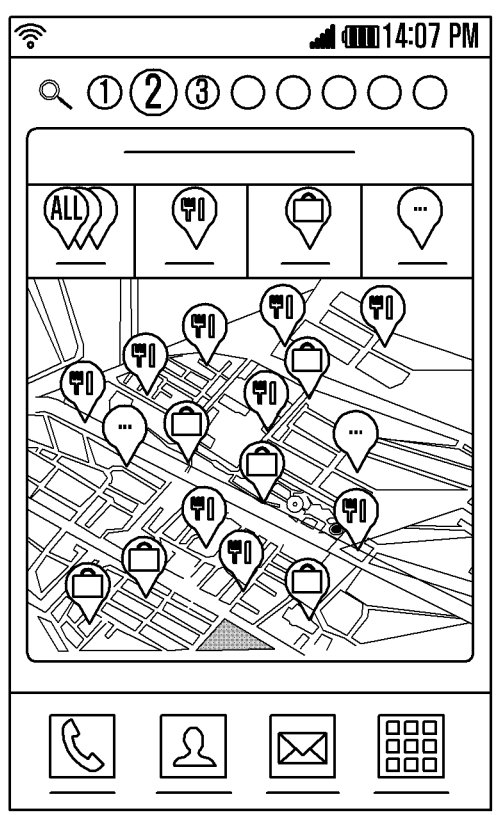
FIG. 9A and FIG. 9B illustrate screens displaying information related to multiple items and a screen showing details related to a particular item.
Figure 9B:
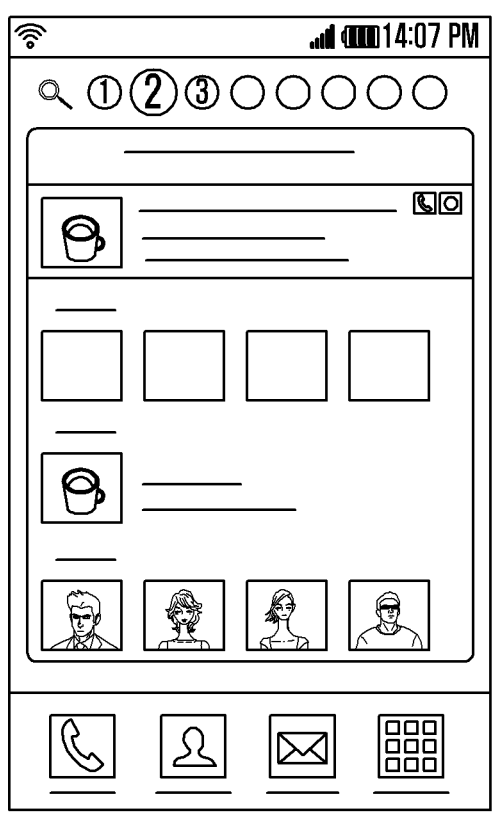
Figure 10A:
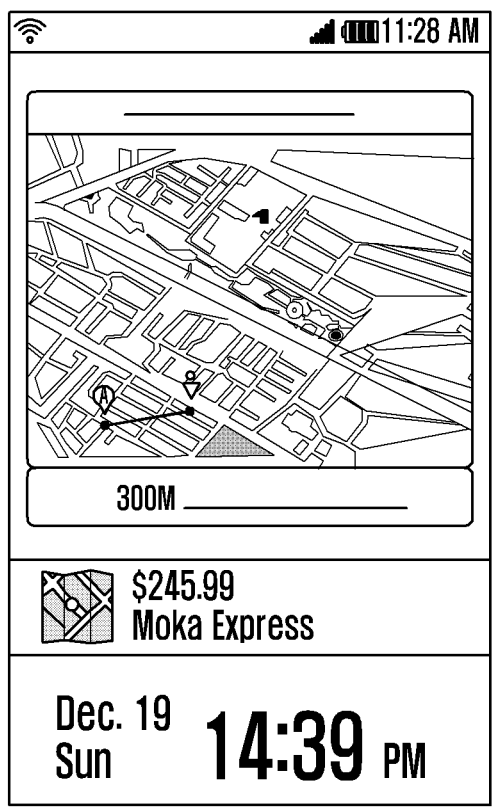
FIG. 10A and FIG. 10B illustrate screens to set a reminder alarm time using location-based item information.
Figure 10B:

FIGS. 8A-8I illustrate screens to describe an interface to which location-based social information is applied, according to an example embodiment of the invention. FIGS. 9A-9B illustrate screens displaying information related to multiple items and a detailed information screen that displays details related to a particular item. FIGS. 10A-10B illustrate screens to set a reminder alarm time using location-based item information.

Referring to FIGS. 8A to 10B, the controller 160 determines whether items of social information include the location information. When the controller 160 ascertains that items include the location information, the controller 160 displays information related to the item on a map, showing various features pertaining to the item. For example, when the controller 160 displays information related to an item, the controller 160 may display different types of identification information, such as users' reviews, places registered in the social information of the user of the mobile device or the other users, events related to the items, the ownership of a corresponding item, sales information, any personal memos, locations providing registered services, stores selling registered items, etc., as shown in FIGS. 8A-8I. The location information regarding the item can be acquired when the item is registered in the social information. For example, if the item is an article of commerce, the address of the store is registered, as location information, in the social information. In addition, if the item is a personal memo, The current location regarding the mobile device is acquired based on a Global Positioning System (GPS), etc. when the memo is registered as social information, and may also be linked with the location information regarding the memo. When stores provide information regarding items provided for sale by such stores, item related events or item selling information may be provided together with the location information. When the controller 160 receives the information, the controller 160 links the location information to items and registers the location information as social information, according to the user's control, such as input selections and settings.

As shown in FIG. 9A, the controller 160 provides respective identification information regarding a number of items on one map on the screen. The controller 160 also displays classification tabs on one side of the screen. The controller 160 may display, on the map, only a user control tab or identification information related to items corresponding to tabs selected by default.

When the user of the mobile device selects the identification information indicating an item, the controller 160 displays the details of the identification information on the detailed information screen, as shown in FIG. 9B. The detailed information screen displays a corresponding item and information related to the users registered in a first user's social information, for example, photo information.

The controller 160 of the mobile device supports a reminder alarm function according to locations based on the social information. When the user has registered items in the social information, the controller 160 identifies the location where the mobile device is currently located and sets a reminder alarm when an item corresponding to previously registered information is within a preset distance from the current location of the mobile device as shown in FIG. 10A. The user can view the item on the reminder alarm screen. If the user needs to view the details of the item, he/she inputs a signal or a user selection to the mobile device. The controller 160 displays the details on the screen of the display unit as shown in FIG. 10B. The user can visit the offline store near his/her current location and purchase the item off-line; that is, in person as opposed to purchasing the item online via the Internet. As such, if the user has registered his/her wish-list items in the social information and roams places related to the items or services, the social information management system provides reminders for the corresponding item or service of the user, so that the user can purchase or enjoy the item or service at a proper time and at a proper store, such as a sales event occurring at a specific store in a specific range of time. The reminding method is implemented using an alarm sound mode or a vibration mode. The reminding mode is set with the mobile device in such a way that, in an example embodiment, a bar shape indicator is small and displayed on one side of the screen as shown in FIG. 10B.

Figure 11A:
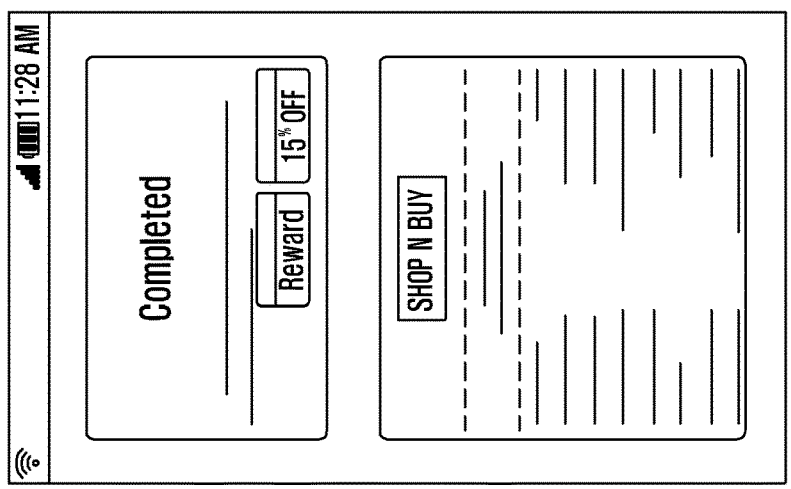
FIG. 11A, FIG. 11B and FIG. 11C illustrate screens to describe the provision of mileages or coupons related to social information.
Figure 11B:
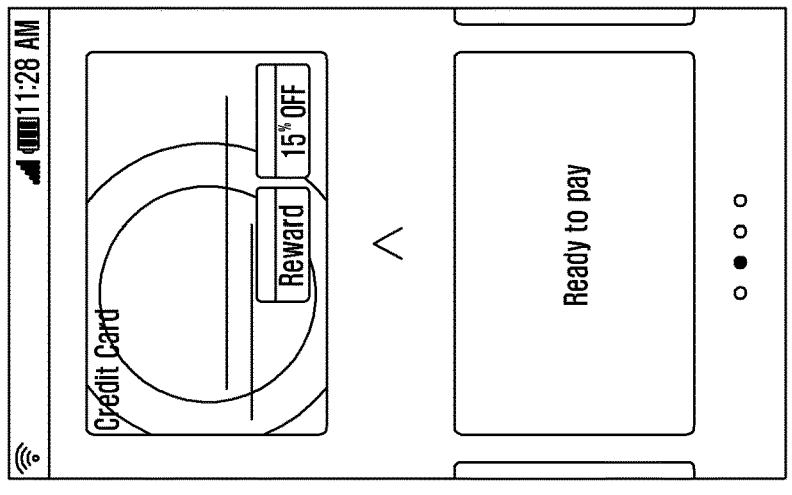
Figure 11C:
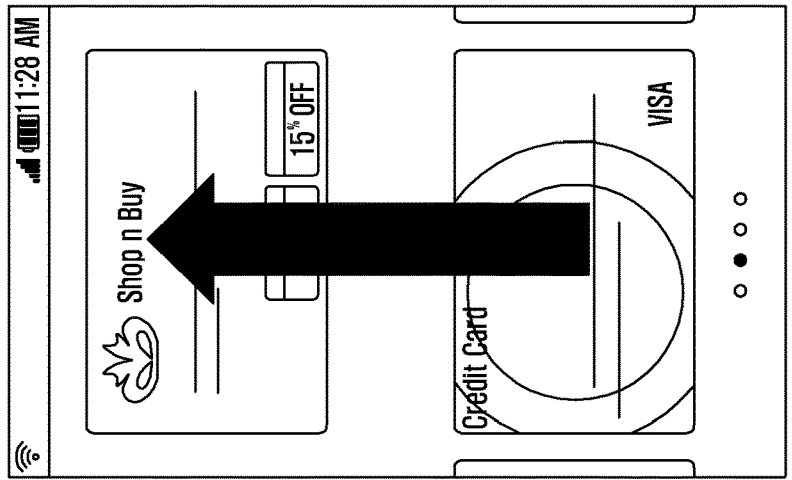

FIGS. 11A-11C illustrate screens to describe the provision of mileages or coupons related to social information.

When a user carries the mobile device 100 and reaches a location, the mobile device 100 receives information related to coupons, mileages, etc. provided at the location. The user may accept the coupons and mileage rewards via the mobile device 100. The controller 160 of the mobile device 100 determines whether the received information is related to items that the user has previously registered in the social information. When the controller 160 ascertains that the received information is related to the user's registered items, the controller 160 displays a screen for providing any coupon or mileage information on the display unit. For example, if the user carries the mobile device 100 and enters a particular store, the controller 160 detects information related to coupons or mileage rewards provided by the store. The controller 160 determines whether the user's credit card information related to the received coupons or mileage rewards is registered in the social information. When the controller 160 ascertains that the user's credit card information related to the received coupons or mileage rewards is registered in the social information, the controller 160 displays a coupon information area 11 and a credit card information area 12 to be applied to corresponding coupon information on the screen as shown in FIG. 11A. In that case, the user can easily identify the coupon or mileage information, provided by the store, via only the mobile device 100, without performing an additional checking process of the coupon information and the credit card information. In addition, the user can easily use the credit card during the application of the coupon or mileage rewards. For example, as shown in FIG. 11B, the user can drag and drop the credit card image from the credit card information area 12 to the coupon information area 11, thereby making a settlement with the application of the coupon or mileage rewards.

When the user makes a gesture to create a signal or to indicate a selection for applying coupons based on the credit card displayed on the credit card information area 12 as shown in FIG. 11B, the controller 160 displays a settlement acknowledgement screen for showing that the settlement has been made via the credit card with the application of the coupon as shown in FIG. 11C. Likewise, if the process above is performed via mileage rewards, the controller 160 may display a screen showing that mileages have been applied on the display unit. To support the functions described above, short-range communication modules, e.g., Near Field Communication (NFC) modules, etc. may be installed in the mobile device 100 and in the stores.

Figure 12A:
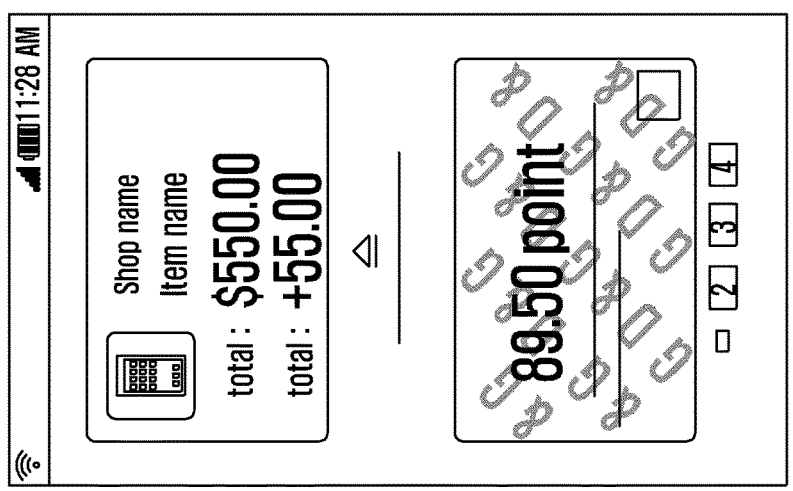
FIG. 12A, FIG. 12B and FIG. 12C illustrate screens to describe a settlement function based on social information.
Figure 12B:
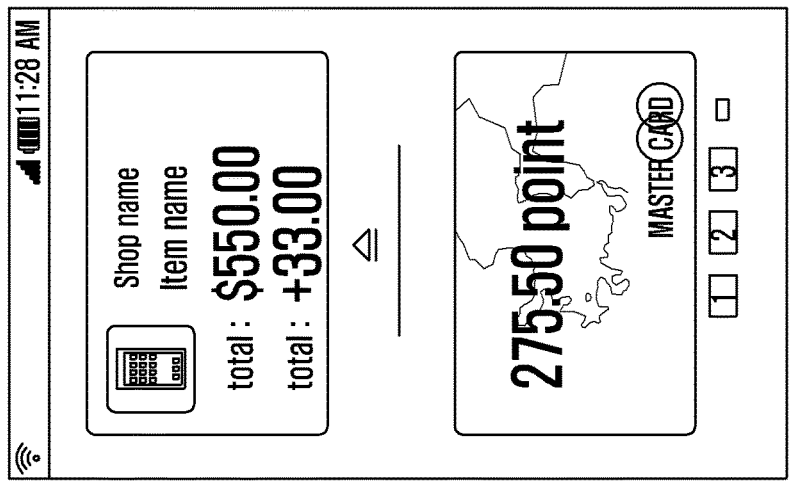
Figure 12C:
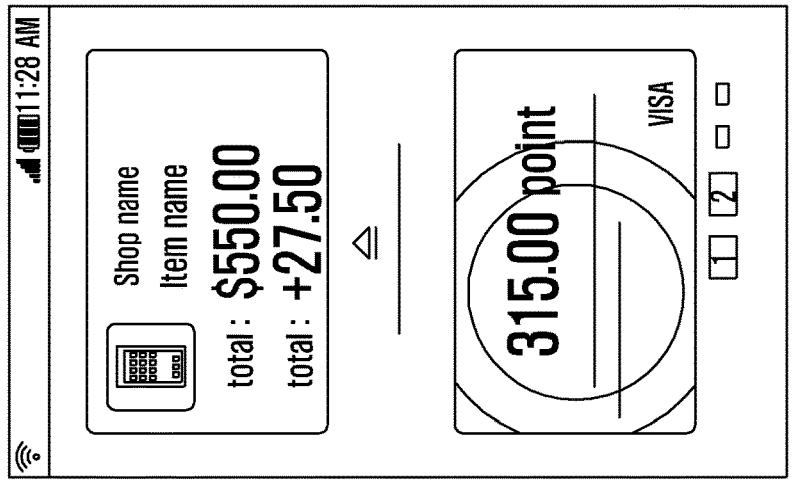

FIGS. 12A-12C illustrate screens to describe a settlement function based on social information.

The user may register information regarding credit cards in the social information to make a settlement for articles of commerce or services during the purchase. The credit card information is registered in a private mode for security. If the user has registered information regarding a number of credit cards in the social information and executes a settlement function via the credit cards in the mobile device, the controller 160 detects the histories or limited conditions of the credit cards to make a settlement with an economically available credit card. When the user has designated one of the credit cards as a settlement method, the controller 160 selects the designated credit card with the highest priority during the settlement. Alternatively, the controller 160 may recommend a credit card to the user during the settlement, based on the results after referring to the histories or limited conditions of the credit cards. For example, the controller 160 identifies events or coupons provided by a store and detects whether the user owns a credit card related to that store, which may offer additional savings or rewards for use of the store-related credit card. When the controller 160 ascertains that the user has a credit card related to events or coupons, the controller 160 recommends such an event-related credit card or a coupon-related credit card to the user during the settlement. In addition, the controller 160 may recommend to the user one of the credit cards that had made a settlement in a store or one of the settlement methods that provides a higher value, such as reward points or mileages, than the others, as shown in FIGS. 12A-12C. The controller 160 identifies the balances, credit limits, user frequency of the credit cards, etc. and recommends to the user one of the credit cards as a settlement method, based on the results of such identification by the controller 160. Alternatively, the controller 160 sums up the points assigned to a variety of factors for a settlement method and then displays the points in an order of recommendations.

The controller 160 can provide integral information regarding the amount of settlements with respect to the entire credit card that the user has owned. When the user has registered a number of credit cards in the social information, the controller 160 accumulates the amount of settlements via the credit cards and provides a total settlement amount. In addition, the controller 160 accumulates the amount of settlements via the credit cards, respectively, and provides the total settlement amounts of the respective credit cards. The controller 160 can also provide points or mileages of the respective credit cards. When the user makes a settlement using points, the controller 160 provides the remaining points after the reduction in points due to the settlement.

Although the embodiment is implemented in such a way that the controller 160 controls the display unit 140 to display one screen showing information regarding one credit card, it should be understood that the invention is not limited to the example embodiment. For example, the controller 160 can also control the display unit 140 to display a number of reduced screens for showing information regarding a number of credit cards respectively. The system can also support a function for searching for information regarding the other credit cards that are not displayed on the display unit, according to the user's input signals.

Figure 13A:
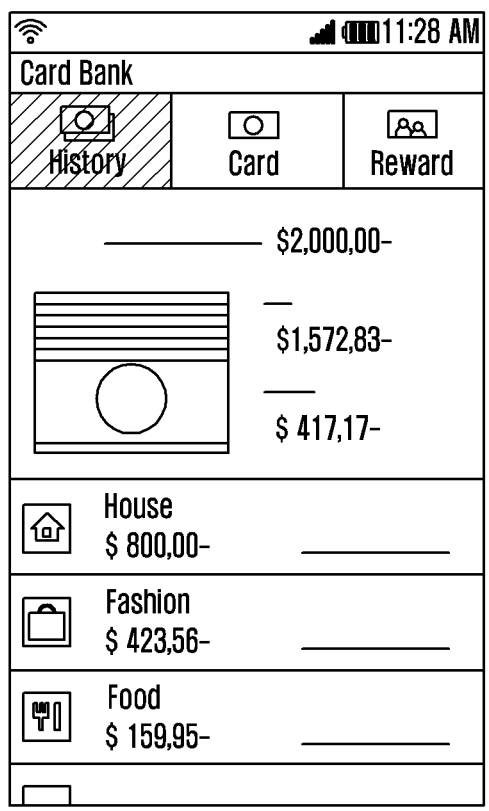
FIG. 13A and FIG. 13B illustrates screen to describe a financial manager function based on social information.
Figure 13B:
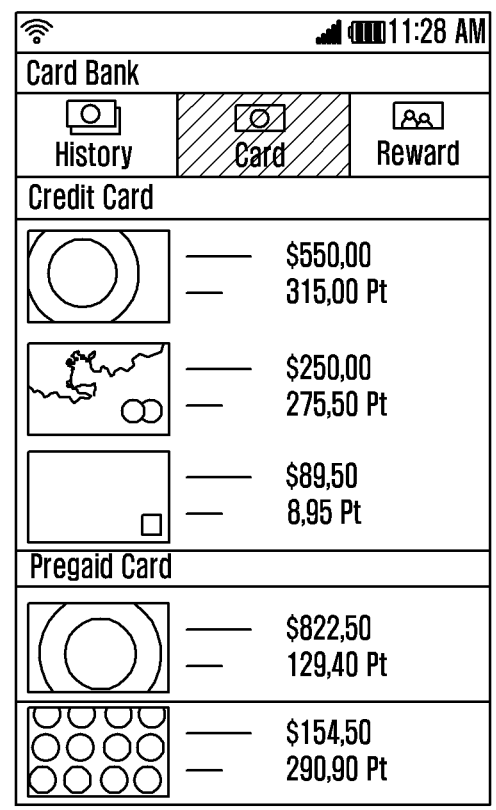

FIGS. 13A-13B illustrate screens to describe a financial manager function based on social information.

When the user has registered credit cards in the social information and creates an input signal for checking the payment history of one of the credit cards, the controller 160 of the mobile device displays the payment history of the first credit card on the display unit 140 as shown in FIG. 13A. If the user designates another credit card to check the payment history, the controller 160 may display the payment history of the other credit card on the display unit 140. In that case, the controller 160 provides classification tabs on the top of the screen. When the user selects a tab related to a payment history, the controller 160 displays a payment history screen regarding a credit card on the display unit as shown in FIG. 13A.

When the user selects a tab labeled 'Card,' the controller 160 displays information regarding a number of credit cards, registered in the social information, on the display unit as shown in FIG. 13B. In addition, when the user selects a tab labeled 'Reward,' the controller 160 may display information regarding coupons or mileages on the display unit. During this process, although the user selects a tab labeled 'Card,' if the number of registered credit cards is less than a preset number, the controller 160 may display, on the display unit 140, part of the credit card information related to the tab labeled 'Reward' as well as items related to the tab labeled 'Card.' When displaying credit card information, the controller 160 can also display the balance, the available amount, the accumulated points of the credit card, etc., in the list.

FIGS. 14A-14B illustrate screens to describe a card registration function based on social information.

When the user needs to register a new card or a membership card of a store, the mobile device 100 can receive information regarding the card application or a registration form from the store. As shown in FIG. 14A, the controller 160 displays the received card form in a card form area 21 on the display unit 140, and the user information, required for the registration of the card, is displayed in a user information area 22. The user drags and drops the user information image from the user information area 22 to the card form area 21, thereby registering the card in the social information as shown in FIG. 14B. To this end, the controller 160 establishes a communication channel with a card issuing machine of the store to receive the card form information therefrom and to transmit the user information thereto, based on the user's actions and control. It should be understood that the controller 160 transmits only information from the user information, required for the issuance of a corresponding card, to the card issuance system, for securing the user's information. Therefore, the card registration process makes a corresponding card to be automatically registered in the user's social information.

Figure 15:
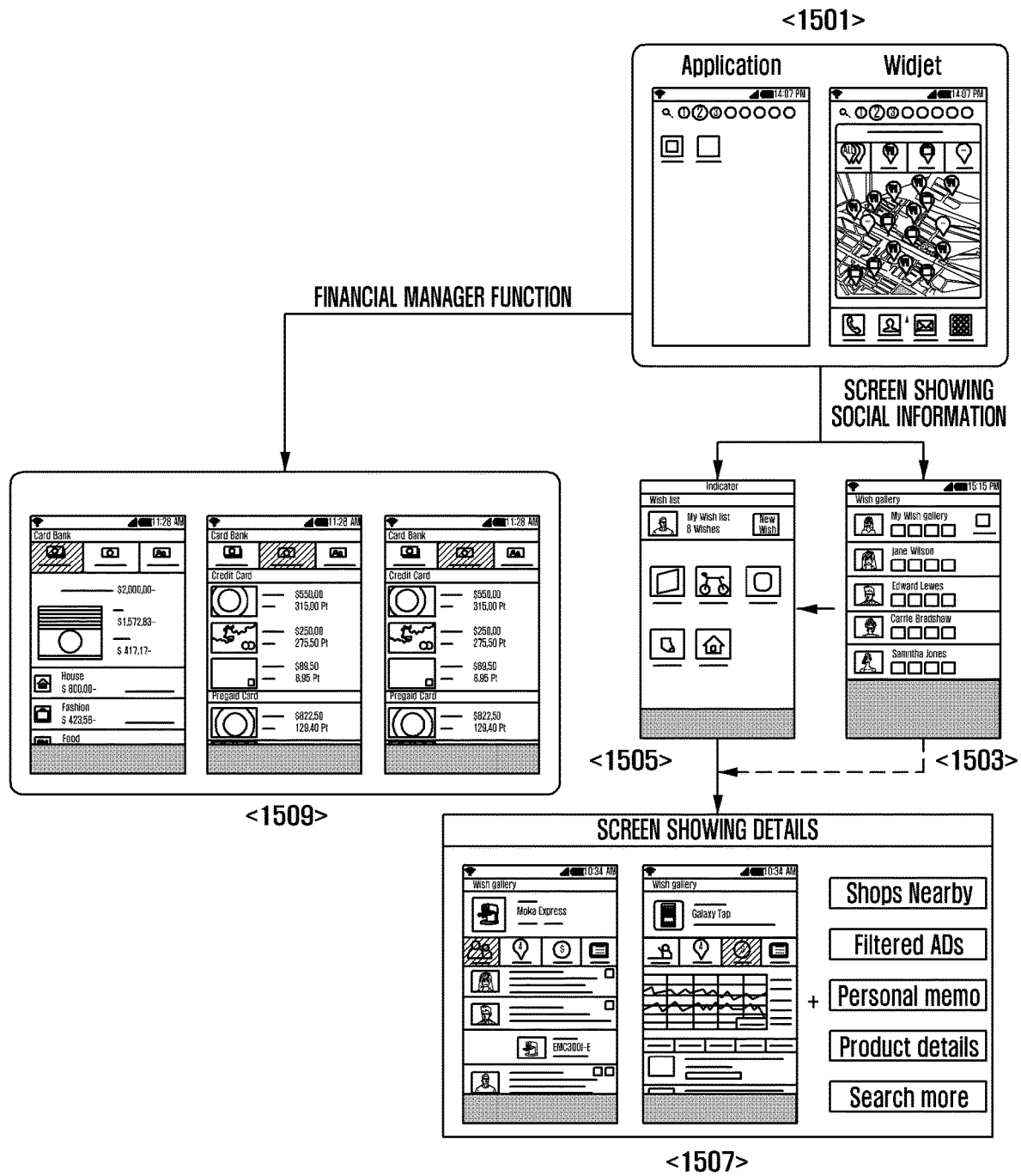
FIG. 15 illustrates screens to describe a screen interface switch based on social information.

FIG. 15 illustrates screens and the relationships between such screens to describe a screen interface switching process based on social information.

As shown in screen 1501, the mobile device 100 provides a screen interface so that the user can easily use the social information via application programs or widgets.

When the user creates a signal or inputs selections into a mobile device 100 for searching for social information, the controller 160 of the mobile device 100 displays an integral screen interface showing shared social information on the screen 1503. When the user selects a list of social information on the screen 1503, the controller 160 displays a list of items included in the selected social information as shown in screen 1505.

When the user selects a view of details regarding an item on the screen 1505, the controller 160 displays a detailed information screen 1507. The detailed information screen 1507 provides screens with a number of classification tabs. For example, the detailed information screen 1507 provides screens that can be classified according to the features from among the information included in the social information. The screens may be: a screen for searching for items based on locations; a screen for filtering social information-based advertisements; a screen with a personal memo, i.e., feedback information; a screen for showing details regarding articles of commerce; a screen for showing additionally searched information; etc. In particular, the social information-based advertisement filtering screen displays only selling information, events or advertisements related to items included in a user's composed social information. For example, when the user with a mobile device is located in a place or if the user moves, the mobile device may wirelessly receive selling information, events, or advertisements from stores near the user. The controller 160 receives information related to only the items registered in the social information, filtering out the other information, and provides the filtered information to the user. That is, the user can receive customized information. The controller 160 performs the filtering operation based on the entire social information shared by the group list.

When the user registers the card information in the social information, the controller 160 can also display a screen 1509 for supporting a financial manager function. That is, the controller 160 can display, on the display unit 140, according to the user's selections, a screen for showing a payment history of various cards, a card information screen for showing a variety of cards registered in the social information, a reward card information screen for showing a variety of membership cards, etc.

As described above, the social information management method and system according to the invention can easily recognize information based on the graded levels of reliability, so that the users can enjoy a higher level of services and satisfaction with such services and with articles of commerce.

Although it is not shown in the drawings, the mobile device may selectively further include various types of components, for example: a short-range communication module for short-range communication; a camera module for acquiring still images/videos; an interface for transmitting/receiving data in a wireless or weird mode; an Internet communication module; and a digital broadcast module for receiving and reproducing broadcasts. With the spread of digital convergence, although the inclusion of various features and modifications of a mobile device are too various to list in this description, it will be easily appreciated to those skilled in the art that the other components equivalent to the above-listed components may be further included to the mobile device according to the invention. Also, it will be appreciated that, according to the purposes in which a mobile device is to be used, the mobile device may be implemented by omitting a particular component or replacing it with other components.

The mobile device according to the invention includes all information communication devices, multimedia devices, and their applications, which can create social information and share the information and can be operated according to communication protocols corresponding to various types of communication systems. For example, the mobile device can be applied to mobile communication terminals, Portable Multimedia Players (PMPs), digital broadcast players, Personal Digital Assistants (PDAs), audio players (e.g., MP3 players), mobile game players, smartphones, laptop computers, hand-held PC, etc.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on a recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. An electronic terminal comprising:
    a display;
    a GPS receiver configured to receive location information of the electronic terminal;
    memory configured to store locations of a plurality of geographic areas;
    a processor configured to:

identify a location of the electronic terminal based on the location information of the electronic terminal;

provide, when the location of the electronic terminal is within a preset distance of a particular one of the geographical areas, an alarm notifying of presence of incentive information corresponding to the particular one of the geographical areas;

when the location of the electronic terminal is substantially the same as a location of the particular one of the plurality of geographic areas, receive the incentive information directly from a predetermined server of a plurality of servers located at the particular one of the plurality of geographic areas;

display an object for the incentive information corresponding to the particular one of the plurality of geographic areas;

present one or more objects representing a corresponding one or more selectable payment accounts on the display;

display an object representing the selected payment account; and when receiving a touch input while the object representing the selected payment account is displayed, authorize payment from the payment account to an entity associated with an incentive.

2. The electronic terminal of claim 1, wherein the selectable payment account is selected from one of a credit card, debit card, gift card, or an electronic wallet.

3. The electronic terminal of claim 1, wherein the processor is further configured to display balances on the objects representing the one or more objects representing the one or more payment accounts.

4. The electronic terminal of claim 1, wherein the processor is further configured to apply the incentive to the payment account.

5. The electronic terminal of claim 4, wherein the processor is further configured to offset the payment by a discount indicated in the incentive.

6. The electronic terminal of claim 4, wherein the processor is further configured to add a credit of an item different from a unit of payment to the payment account.

7. A non-transitory computer-readable medium storing a plurality of instructions, wherein execution of the instructions by a processor causes:

identifying a location of an electronic terminal based on location information of the electronic terminal received from a GPS receiver;

providing, when the location of the electronic terminal is within a preset distance of a particular one of a plurality of geographical areas stored in a memory, an alarm notifying for presence of incentive information corresponding to the particular one of the geographical areas;

when the location of the electronic terminal is substantially the same as a location of the particular one of the plurality of geographic areas, receiving the incentive information directly from a predetermined server of a plurality of servers located at the plurality of geographic areas;

displaying an object for the incentive information corresponding to the particular one of the plurality of geographic areas on a display;

presenting one or more objects representing a corresponding one or more selectable payment accounts on the display;

displaying an object representing the selected payment account; and when receiving a touch input while the object representing the selected payment account is displayed, authorizing payment from the payment account to an entity associated with an incentive.

8. The non-transitory computer-readable medium of claim 7, wherein the payment account is selected from one of a credit card, debit card, gift card, or an electronic wallet.

9. The non-transitory computer-readable medium of claim 7, wherein execution of the instructions further causes displaying balances on the objects representing the one or more objects representing the one or more payment accounts.

10. The non-transitory computer-readable medium of claim 7, wherein execution of the instructions further causes applying the incentive to the payment account.

11. The non-transitory computer-readable medium of claim 10, wherein applying the incentive comprises offsetting the payment by a discount indicated in the incentive.

12. The non-transitory computer-readable medium of claim 10, wherein applying the incentive comprises adding a credit of an item different from a unit of payment to the payment account.

13. A method comprising:

identifying a location of an electronic terminal based on location information of the electronic terminal received from a GPS receiver;

providing, when the location of the electronic terminal is within a preset distance of a particular one of a plurality of geographical areas stored in a memory, an alarm notifying for presence of incentive information corresponding to the particular one of the geographical areas;

when the location of the electronic terminal is substantially the same as a location of the particular one of the plurality of geographic areas, receiving incentive information directly from a predetermined server of a plurality of servers located at the particular one of the plurality of geographic areas;

displaying an object for the incentive information corresponding to the particular one of the plurality of geographic areas on a display;

presenting one or more objects representing a corresponding one or more selectable payment accounts on the display;

displaying an object representing the selected payment account; and when receiving a touch input while the object representing the selected payment account is displayed, authorizing payment from the payment account to an entity associated with an incentive.

14. The method of claim 13, wherein the payment account is selected from one of a credit card, debit card, gift card, or an electronic wallet.

15. The method of claim 13, further comprising displaying balances on the objects representing the one or more objects representing the one or more payment accounts.

16. The method of claim 13, further comprising applying the incentive to the payment account.

17. The method of claim 16, wherein applying the incentive comprises adding a credit of an item different from a unit of payment to the payment account.

* * * * *